United States Patent
Wu

(10) Patent No.: US 9,435,711 B2
(45) Date of Patent: Sep. 6, 2016

(54) OTDR LIGHT REFLECTION STRUCTURE OF OPTICAL SUB-ASSEMBLY FOR TRANSCEIVERS OF PON SYSTEM

(75) Inventor: Chin-Tsung Wu, Taipei (TW)

(73) Assignee: EZCONN Corporation, Taipei (TW)

( * ) Notice: Subject to any disclaimer, the term of this patent is extended or adjusted under 35 U.S.C. 154(b) by 44 days.

(21) Appl. No.: 13/281,514

(22) Filed: Oct. 26, 2011

(65) Prior Publication Data
US 2013/0107265 A1    May 2, 2013

(51) Int. Cl.
 G01B 11/06    (2006.01)
 G01M 11/00   (2006.01)
 H04B 10/071  (2013.01)

(52) U.S. Cl.
 CPC ........ *G01M 11/3109* (2013.01); *H04B 10/071* (2013.01)

(58) Field of Classification Search
 CPC .................................................. G01B 11/0625
 USPC ......................................................... 356/73.1
 See application file for complete search history.

(56) References Cited

U.S. PATENT DOCUMENTS

| | | | | |
|---|---|---|---|---|
| 4,878,731 A | * | 11/1989 | Caron et al. ..................... 385/24 |
| 5,251,001 A | * | 10/1993 | Dave et al. ................... 356/73.1 |
| 5,329,392 A | * | 7/1994 | Cohen .............................. 398/13 |
| 5,491,574 A | * | 2/1996 | Shipley ........................... 398/13 |
| 5,859,944 A | * | 1/1999 | Inoue ..................... G02B 6/021 |
| | | | | 385/37 |
| 6,749,347 B1 | * | 6/2004 | Ichihara .............. G02B 6/4204 |
| | | | | 385/88 |
| 7,467,898 B2 | * | 12/2008 | Nakazawa et al. ............. 385/92 |
| 2004/0146304 A1 | * | 7/2004 | Kuhara ................ G02B 6/4206 |
| | | | | 398/138 |
| 2007/0230878 A1 | * | 10/2007 | Nakazawa et al. ............. 385/92 |
| 2010/0066997 A1 | * | 3/2010 | Conner et al. ............... 356/73.1 |
| 2010/0183268 A1 | * | 7/2010 | Kihara ................ G02B 6/4206 |
| | | | | 385/93 |

* cited by examiner

Primary Examiner — Tarifur Chowdhury
Assistant Examiner — Omar Nixon

(57) ABSTRACT

An OTDR light reflection structure of optical sub-assembly for transceivers of PON system includes: a retainer member installed at an end section of a light guide unit of the optical sub-assembly for transceivers and positioned in the optical sub-assembly for transceivers, the retainer member having a first end and a second end; and a light reflection filter affixed to the first end of the retainer member. When an OTDR emits a specific wavelength of light, the light reflection filter directly reflects the light back into the light guide unit. Then the signal is transmitted back to the OTDR for the OTDR to identify the subscriber position of the feedback signal and judge whether the optical fiber line is in a normal state.

20 Claims, 4 Drawing Sheets

OTDR LIGHT REFLECTION STRUCTURE OF OPTICAL SUB-ASSEMBLY FOR TRANSCEIVERS OF PON SYSTEM

BACKGROUND OF THE INVENTION

1. Field of the Invention

The present invention relates to An OTDR light reflection structure of optical sub-assembly for transceivers of PON system.

2. Description of the Related Art

Following the rapid growth of global Internet, the traditional networks have become unable to satisfy the demands for high-speed information transmission application caused by communication revolution. The matured photonic technologies and diversified products have duly provided a solution to the requirement for mass bandwidths of the global Internet, high-quality and multimedia networks and various data communications. Accordingly, various optical communication network frameworks have been successively developed, such as passive optical network (PON) system. The PON system must employ an optical time domain reflectometer (OTDR) for measuring quality of the optical fiber and detecting failures.

In general, the PON system can be a 1-to-8, 1-to-16 or 1-to-32 multi-optical fiber framework. The OTDR can monitor and detect failures within a few kilometers. However, the OTDR cannot find out which optical fiber is with the problem. In maintenance, it is inevitable to exactly find the failure and effectively remove the failure.

Currently, the optical sub-assembly for transceivers, such as bi-direction optical sub-assembly (BOSA) and tri-direction optical sub-assembly (TRI-DI OSA), installed at a subscriber terminal is not provided with any device or function for reflecting back the light emitted from the OTDR. After leaving the optical fiber, the light will scatter and cannot be reflected and focused back to the optical fiber. As shown in FIG. 1, in order to for the subscriber terminal to transmit a feedback signal to the OTDR 12 for the OTDR 12 to accurately judge the condition of the optical cable of the network, an OTDR light reflection device 11 is installed outside the BOSA or TRI-DI OSA 10 to reflect the signal back to the OTDR 12. However, the OTDR light reflection device 11 is an external added device. For a multi-optical fiber PON system, it is necessary to install several OTDR light reflection devices 11. The OTDR light reflection device 11 is quite expensive so that the solution will result in considerable increase of cost.

SUMMARY OF THE INVENTION

A primary object of the present invention is to provide an OTDR light reflection structure of optical sub-assembly for transceivers of PON system, which enables the OTDR to judge whether the optical fiber line is in a normal state.

To achieve the above and other objects, the OTDR light reflection structure of the present invention includes: a retainer member installed at an end section of a light guide unit of the optical sub-assembly for transceivers and positioned in the optical sub-assembly for transceivers, the retainer member having a first end and a second end; and a light reflection filter affixed to the first end of the retainer member. When an OTDR emits a specific wavelength of light, the light reflection filter directly reflects the light back into the light guide unit. Then the signal is transmitted back to the OTDR for the OTDR to identify the subscriber position of the feedback signal and check the quality of the optical fiber line.

BRIEF DESCRIPTION OF THE DRAWINGS

The structure and the technical means adopted by the present invent ion to achieve the above and other objects can be best understood by referring to the following detailed description of the preferred embodiments and the accompanying drawings, wherein.

DETAILED DESCRIPTION OF THE PREFERRED EMBODIMENTS

Figure 1:
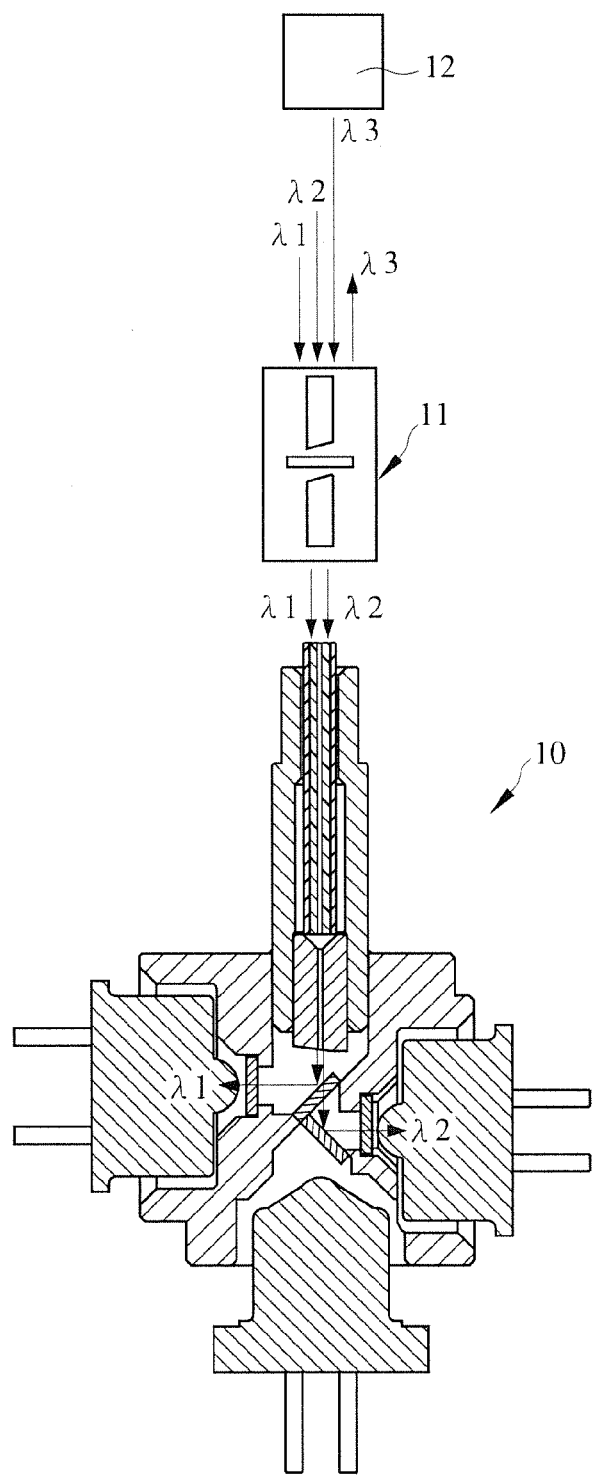
FIG. 1 is a sectional view of a conventional optical sub-assembly for transceivers, showing that an OTDR light reflection structure is installed outside the optical sub-assembly for transceivers.
Figure 2:
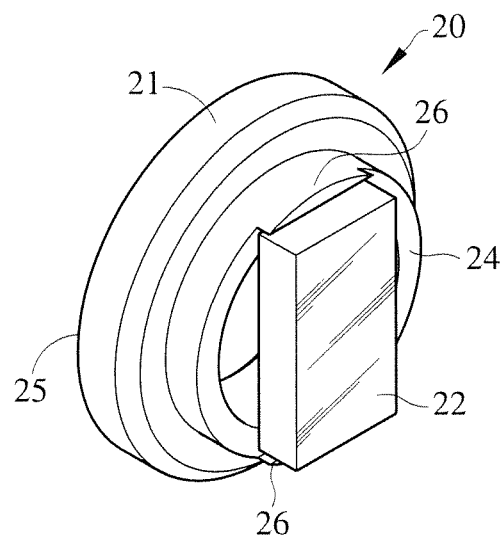
FIG. 2 is a perspective view of the OTDR light reflection structure of the present invention.
Figure 3:
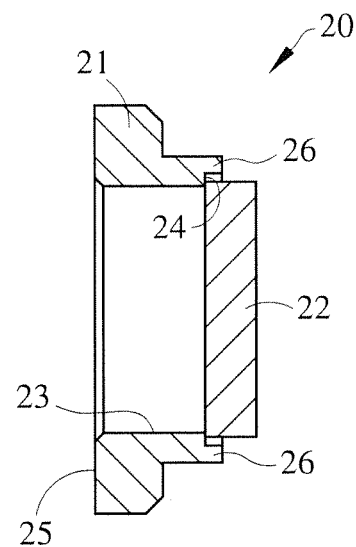
FIG. 3 is a sectional view of the OTDR light reflection structure of the present invention.

Please refer to FIGS. 2 and 3. The OTDR light reflection structure 20 of optical sub-assembly for transceivers of PON system of the present invention includes a retainer member 21 and a light reflection filter 22. The retainer member 21 has an internal receiving hole 23, a first end 24 and a second end 25 opposite to the first end 24. The reflection filter 22 is affixed to the first end 24 of the retainer member 21. In practice, the reflection filter 22 can be connected with the retainer member 21 by means of a bonding material.

The retainer member 21 further includes multiple restriction sections 26 outward extending from the first end 24. The restriction sections 26 define a space for accommodating the reflection filter 22, whereby the reflection filter 22 is positioned in an axis of the retainer member 21 for totally reflecting back optical signal.

Figure 4:
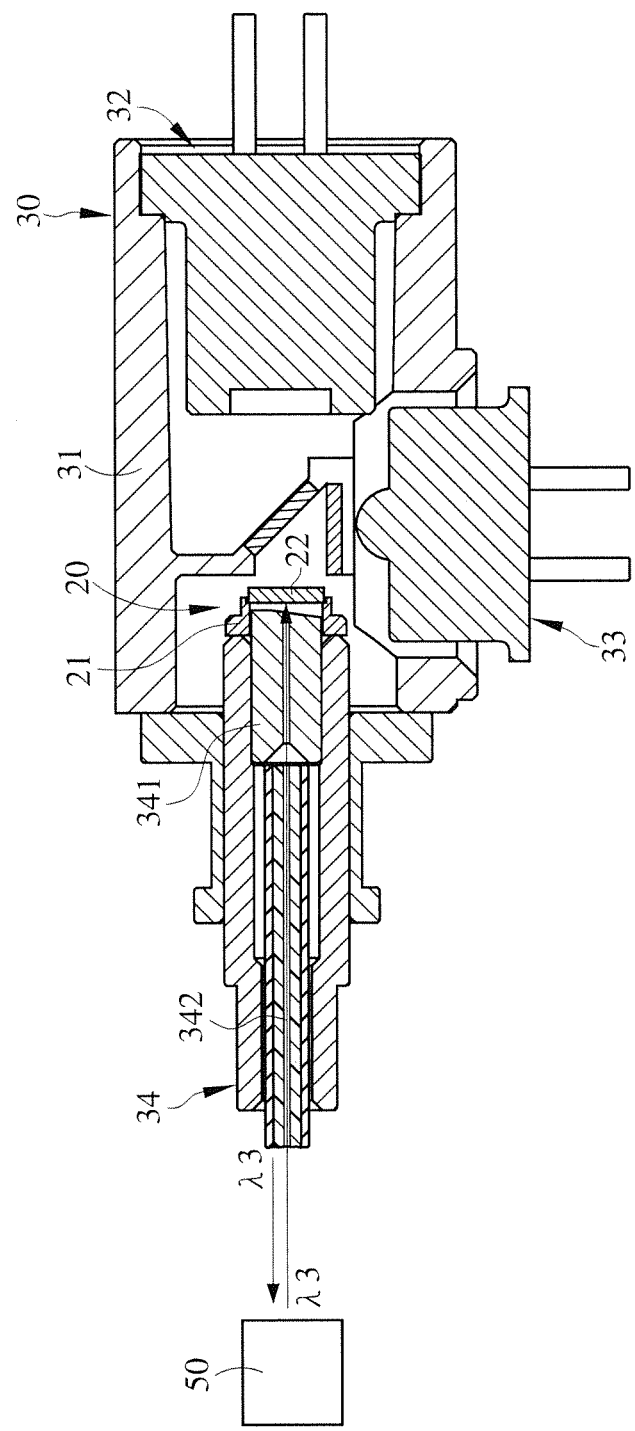
FIG. 4 is a sectional view showing that the OTDR light reflection structure of the present invention is applied to a BOSA.
Figure 5:
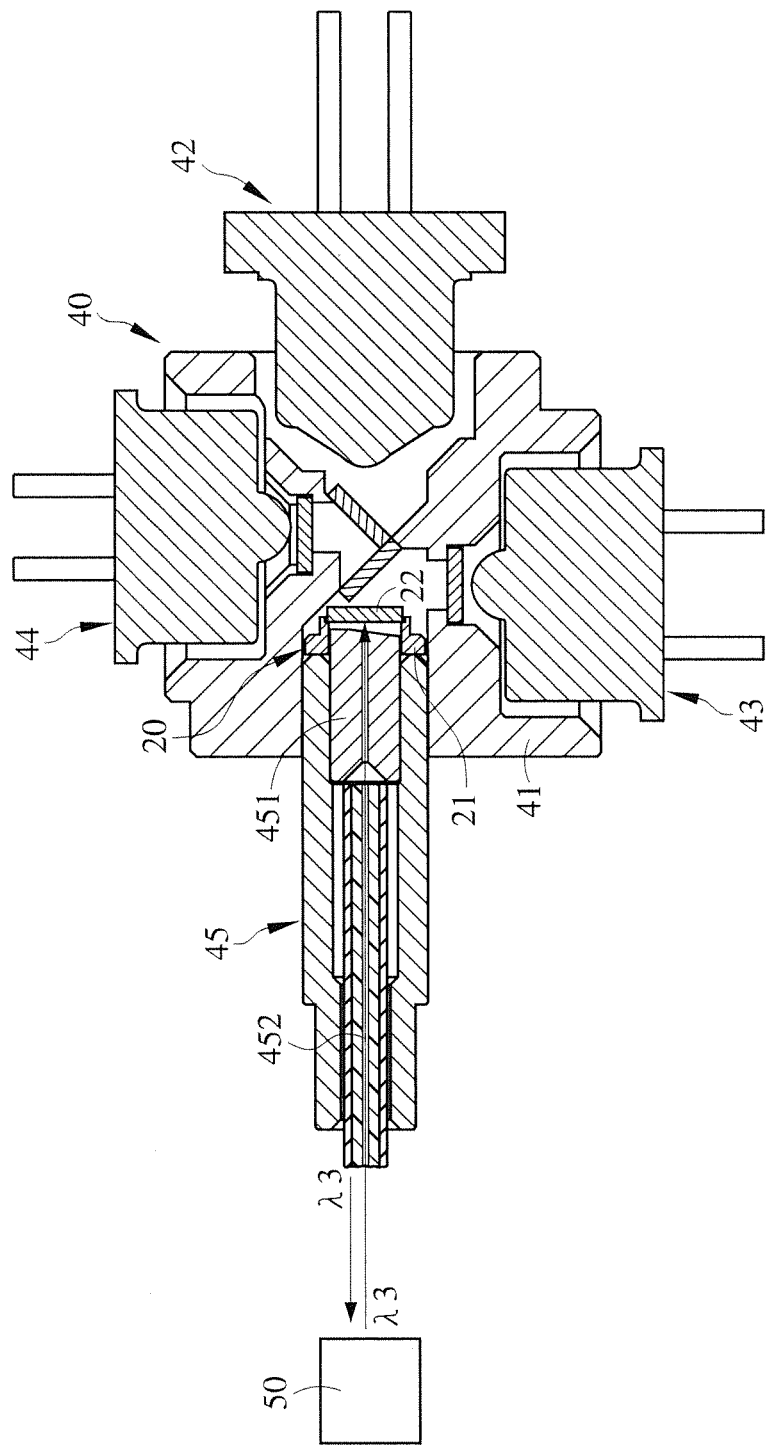
FIG. 5 is a sectional view showing that the OTDR light reflection structure of the present invention is applied to a TRI-DI OSA.

In practice, the OTDR light reflection structure 20 of the present invention is applicable to an optical sub-assembly for transceivers such as a bi-direction optical sub-assembly (BOSA) (FIG. 4) and a tri-direction optical sub-assembly (TRI-DI OSA) (FIG. 5).

As shown in FIG. 4, the BOSA 30 can receive bi-direction signals in the same optical fiber. The BOSA 30 includes a main housing 31, a light-emitting unit 32 connected to the main housing 31, a light detection unit 33 connected to the main housing 31 and a light guide unit 34 also connected to the main housing 31. The optical signal of the light-emitting unit 32 is coupled to the optical fiber 342 of the light guide unit 34. The optical signal coming from the light guide unit 34 is focused to the light detection unit 33.

In the present invention, the OTDR light reflection structure 20 is installed in the BOSA 30 with an end section of the light guide unit 34 inserted in the receiving hole 23 of the retainer member 21. The light reflection filter 22 is positioned in a position close to the ferrule 341 of the light guide unit 34.

As shown in FIG. 5, the TRI-DI OSA 40 can receive both digital signals and analog signals and transmit digital signals in the same optical fiber 452. The TRI-DI OSA 40 includes a main housing 41, a light-emitting unit 42 connected to the main housing 41, a first light detection unit 43 connected to the main housing 41, a second light detection unit 44 connected to the main housing 41 and a light guide unit 45 also connected to the main housing 41. The optical signal of the light-emitting unit 42 is coupled to the optical fiber 452 of the light guide unit 45. The optical signal coming from the light guide unit 45 is focused to the first light detection unit 43 or the second light detection unit 44.

In the present invention, the OTDR light reflection structure 20 is installed in the TRI-DI OSA 40 with an end section of the light guide unit 45 inserted in the receiving hole 23 of the retainer member 21. The light reflection filter 22 is positioned in a position close to the ferrule 451 of the light guide unit 45.

As aforesaid, the OTDR light reflection structure 20 is installed in the BOSA 30 or the TRI-DI OSA 40. Accordingly, when the OTDR 50 emits a specific wavelength of light, the light reflection filter 22 can directly reflect the light back into the optical fiber 342 or 452 of the light guide unit 34 (FIG. 4) or 45 (FIG. 5). Then the signal is transmitted back to the OTDR 50 for the OTDR 50 to identify the subscriber position of the feedback signal and judge whether the optical fiber line is in a normal state. It should be noted that the light reflection filter 22 will not affect permeability of other wavelengths of light operated in the system.

Moreover, the OTDR light reflection structure 20 of the present invention includes fewer components so that the manufacturing cost is greatly lowered.

The above embodiments are only used to illustrate the present invention, not intended to limit the scope thereof. It is understood that many changes or modifications of the above embodiments can be made by those who are skilled in this field without departing from the spirit of the present invention. The scope of the present invention is limited only by the appended claims.

What is claimed is:

1. An optical module comprising:
    a ferrule; and
    a light reflection filter on an optical path, wherein said light reflection filter is configured to reflect a wavelength of light, transmitted along said optical path to pass through a hole in said ferrule and then through an empty space to said light reflection filter, back along said optical path and allow permeability of another wavelength of said light.

2. The optical module of claim 1 further a retainer provided with a hole therein receiving and fitting with a portion of said ferrule, wherein said light reflection filter is affixed to said retainer.

3. The optical module of claim 2, wherein said retainer is integral as a single part.

4. The optical module of claim 2, wherein said retainer comprises a first restriction section and a second restriction section opposite to said first restriction section, wherein said light reflection filter is arranged between said first and second restriction sections.

5. The optical module of claim 4, wherein an interval is between said first restriction section and said light reflection filter.

6. The optical module of claim 2, wherein said light reflection filter has a surface facing said ferrule, wherein said surface of said light reflection filter has a periphery contacting said retainer.

7. The optical module of claim 1, wherein said light is configured to be incident to a surface of said light reflection filter at a substantially right angle to said surface.

8. The optical module of claim 1, wherein said ferrule has a first surface sloping relative to said optical path and facing a second surface of said light reflection filter, wherein said second surface is planar and substantially vertical to said optical path, wherein a first axial distance between said first and second surfaces and parallel with said optical path is greater than a second axial distance between said first and second surfaces and parallel with said optical path, wherein said first axial distance is opposite to said second axial distance with respect to said optical path.

9. The optical module of claim 1 further comprising a housing provided with a first opening therein having said optical path pass therethrough, and a light emitting unit received in a second opening in said housing, wherein said first and second openings are at opposite sides of said housing.

10. The optical module of claim 1 further comprising a housing provided with a first opening therein having said optical path pass therethrough, and a light detection unit received in a second opening in said housing, wherein said first and second openings are at neighboring sides of said housing.

11. An optical module comprising:
    a ferrule;
    a retainer provided with a hole therein receiving and fitting with a portion of said ferrule; and
    a light filter affixed to said retainer and configured to allow permeability of a wavelength of light, wherein an optical path passes through a hole in said ferrule and then through an empty space to said light filter, wherein said ferrule has a first surface sloping relative to said optical path and facing a second surface of said light filter, wherein said second surface is substantially vertical to said optical path, wherein a first axial distance between said first and second surfaces and parallel with said optical path is greater than a second axial distance between said first and second surfaces and parallel with said optical path, wherein said first axial distance is opposite to said second axial distance with respect to said optical path.

12. The optical module of claim 11, wherein said second surface is planar.

13. The optical module of claim 11, wherein said second surface of said light filter has a periphery contacting said retainer.

14. The optical module of claim 11 further comprising a housing provided with a first opening therein having said optical path pass therethrough, and a light detection unit at a second opening in said housing, wherein said first and second openings are at neighboring sides of said housing.

15. The optical module of claim 11, wherein said retainer comprises a first restriction section and a second restriction section opposite to said first restriction section, wherein said light filter is arranged between said first and second restriction sections.

16. The optical module of claim 15 wherein an interval is between said first restriction section and said light reflection filter.

17. The optical module of claim 11 further comprising a housing provided with a first opening therein having said optical path pass therethrough, and a light emitting unit received in a second opening in said housing, wherein said first and second openings are at opposite sides of said housing.

18. The optical module of claim 11, wherein said retainer is integral as a single part.

19. The optical module of claim 11, wherein said light filter is configured to reflect another wavelength of light, transmitted along said optical path to pass through said hole in said ferrule and then through said empty space to said light filter, back along said optical path.

20. The optical module of claim 11 further comprising a housing provided with a first opening therein having said optical path pass therethrough, a first light detection unit at a second opening in said housing and a second light detection unit at a third opening in said housing, wherein said first and second openings are at neighboring sides of said housing, said first and third openings are at neighboring sides of said housing and said second and third openings are at opposite sides of said housing.

* * * * *